United States Patent [19]

Konstant et al.

[11] Patent Number: 4,613,270

[45] Date of Patent: Sep. 23, 1986

[54] STORAGE RACK HAVING BAYS WITH MULTIPLE RAILS AND INTERLOCKING TROLLEYS

[75] Inventors: Anthony N. Konstant, Winnetka; John J. Weider, Arlington Heights, both of Ill.

[73] Assignee: Speedrack, Inc., Skokie, Ill.

[21] Appl. No.: 577,182

[22] Filed: Feb. 6, 1984

Related U.S. Application Data

[63] Continuation-in-part of Ser. No. 552,667, Nov. 17, 1983.

[51] Int. Cl.4 .............................................. A47F 5/00
[52] U.S. Cl. ................................... 414/276; 211/151; 414/286
[58] Field of Search ...................... 414/267, 276, 286; 211/151, 162; 104/248, 251

[56] References Cited

U.S. PATENT DOCUMENTS

| 266,301 | 10/1882 | Morris | 187/12 |
|---|---|---|---|
| 2,798,267 | 7/1957 | Anderson | 104/128 |
| 3,021,795 | 2/1962 | Hayba et al. | 104/251 |
| 3,399,784 | 9/1968 | Buchbinder et al. | 211/151 |
| 3,465,894 | 9/1964 | Setecka | 211/124 |
| 3,757,967 | 9/1973 | Colbridge | 414/286 |
| 4,155,462 | 5/1979 | Bendel | 211/151 |
| 4,341,313 | 7/1982 | Doring | 211/151 |
| 4,462,500 | 7/1984 | Konstant et al. | 211/151 |

FOREIGN PATENT DOCUMENTS 1122446 1/1962 Fed. Rep. of Germany .

Primary Examiner—Robert J. Spar
Assistant Examiner—Ken Muncy
Attorney, Agent, or Firm—Fitch, Even, Tabin & Flannery

[57] ABSTRACT

A storage rack comprising a plurality of bays each having at least a front storage location and a rear storage location and which is adapted to receive at least two loads with the first-received load being movable between the locations. Each bay comprises an open front end through which the loads can be inserted and removed, a support surface for supporting a load at the front storage location, and first rails disposed above the support surface and extending between the storage locations. Each bay further comprises a trolley for carrying the first-received load. The trolley is supported by the rails and is movable on the rails between the locations so that both loads can be inserted into the bays at the front storage location.

14 Claims, 13 Drawing Figures

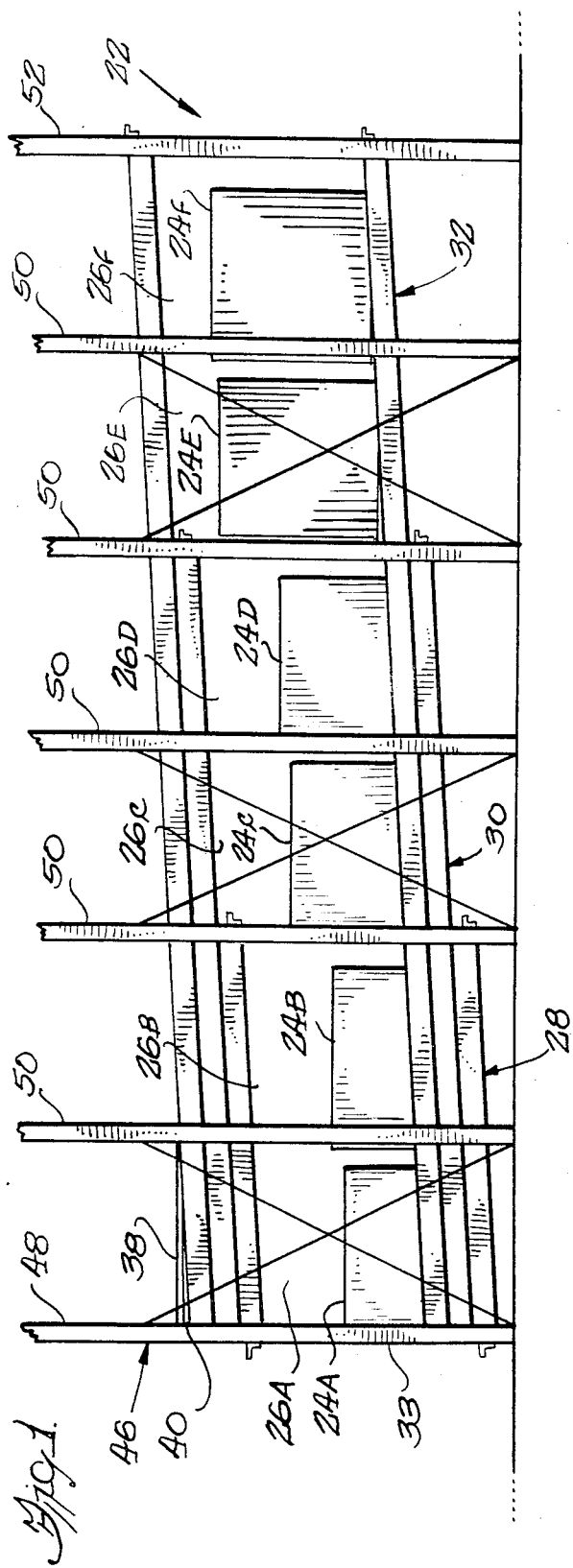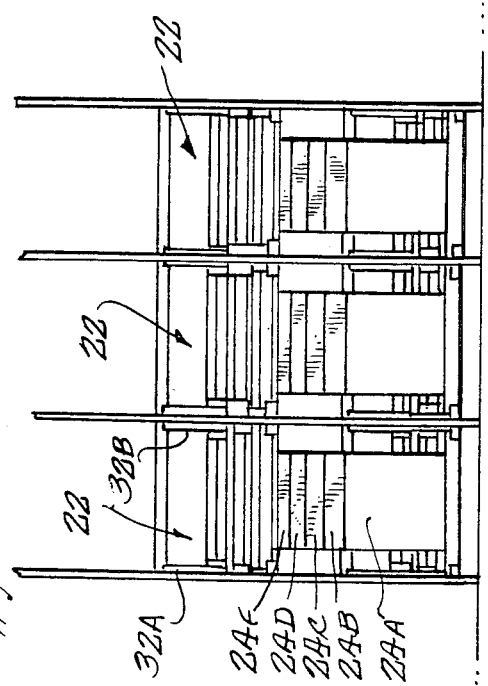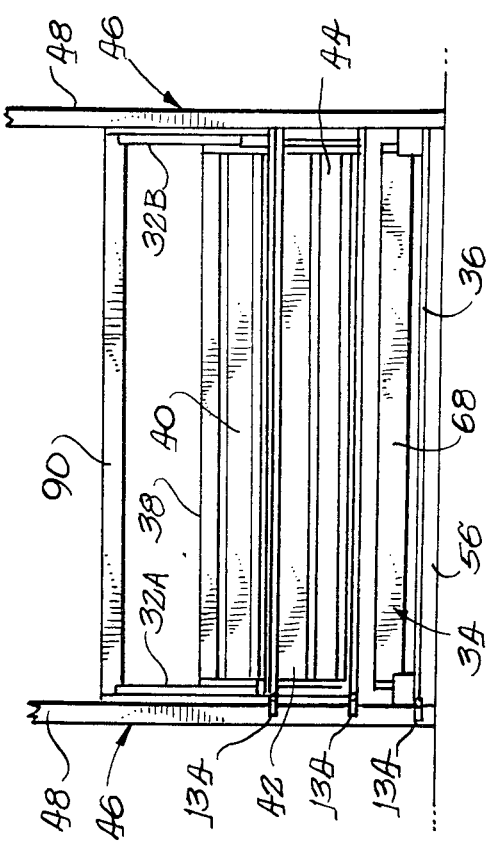

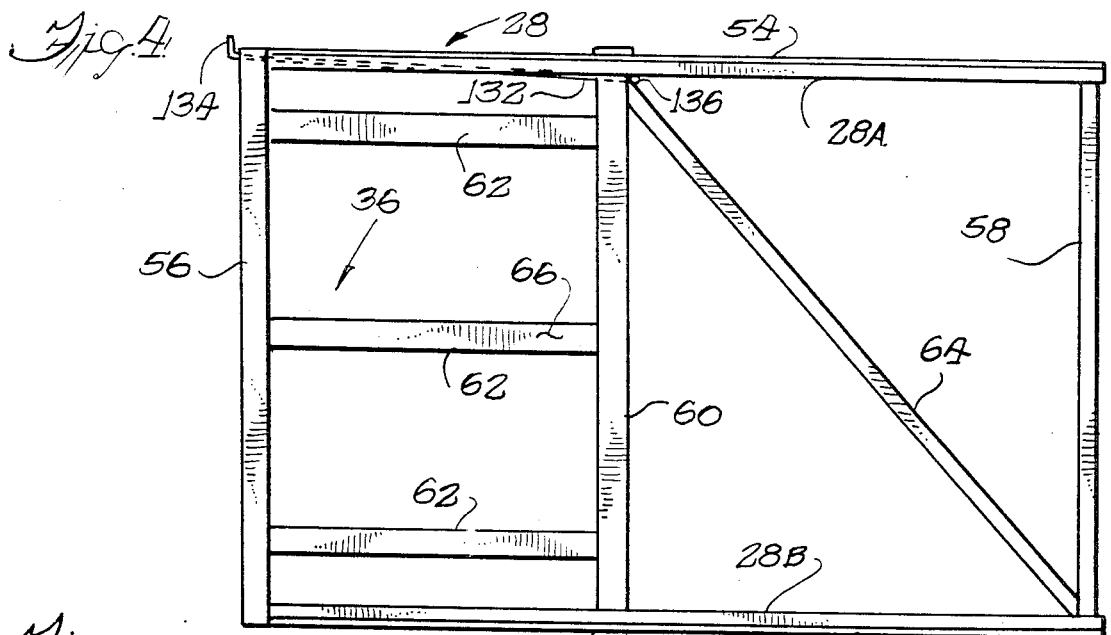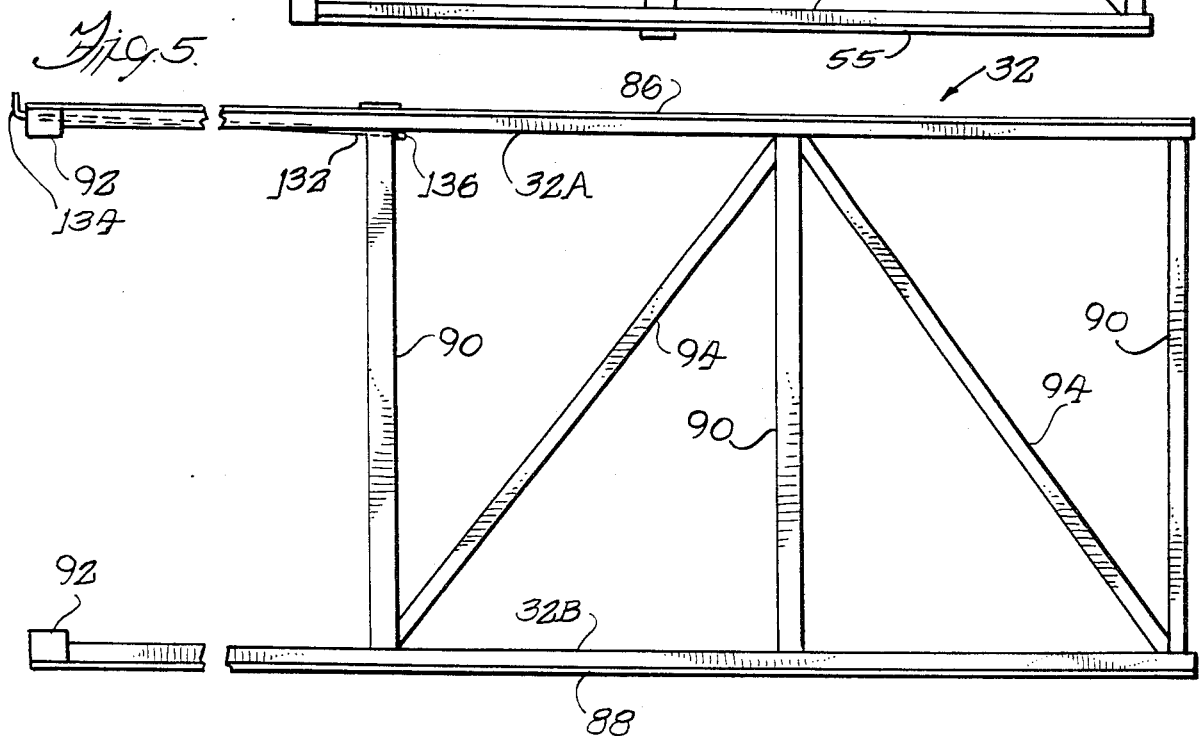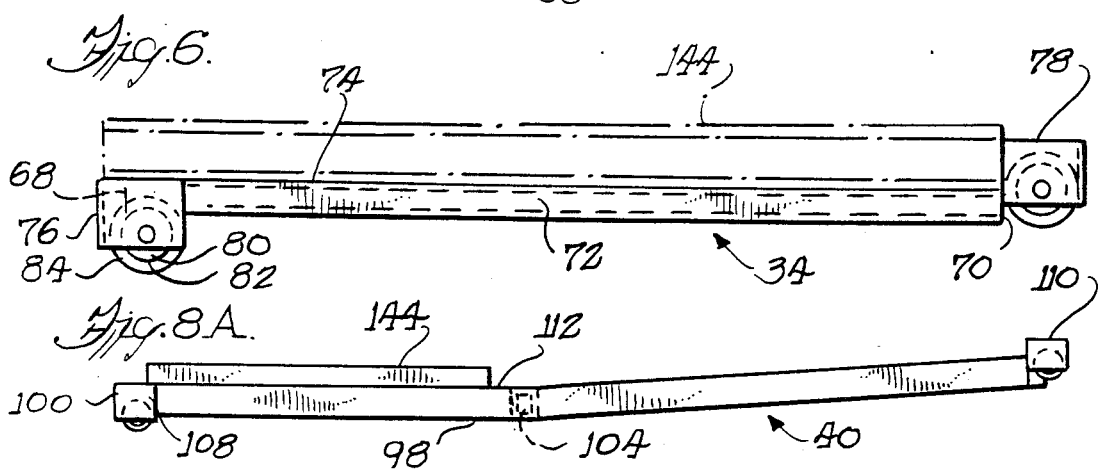

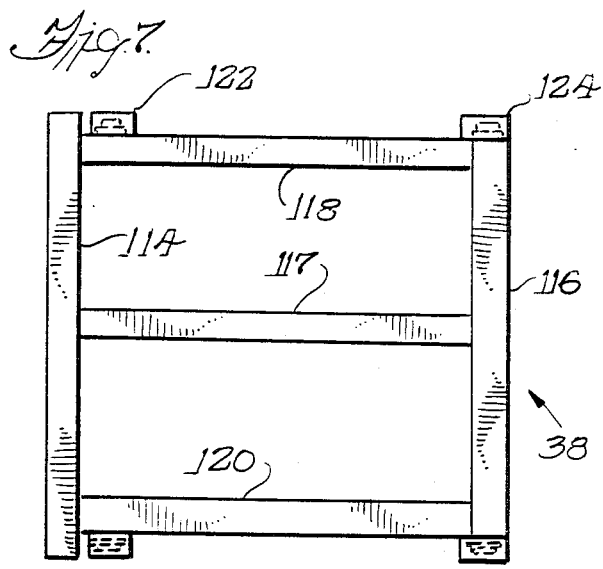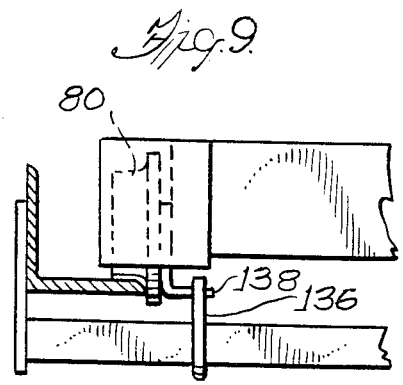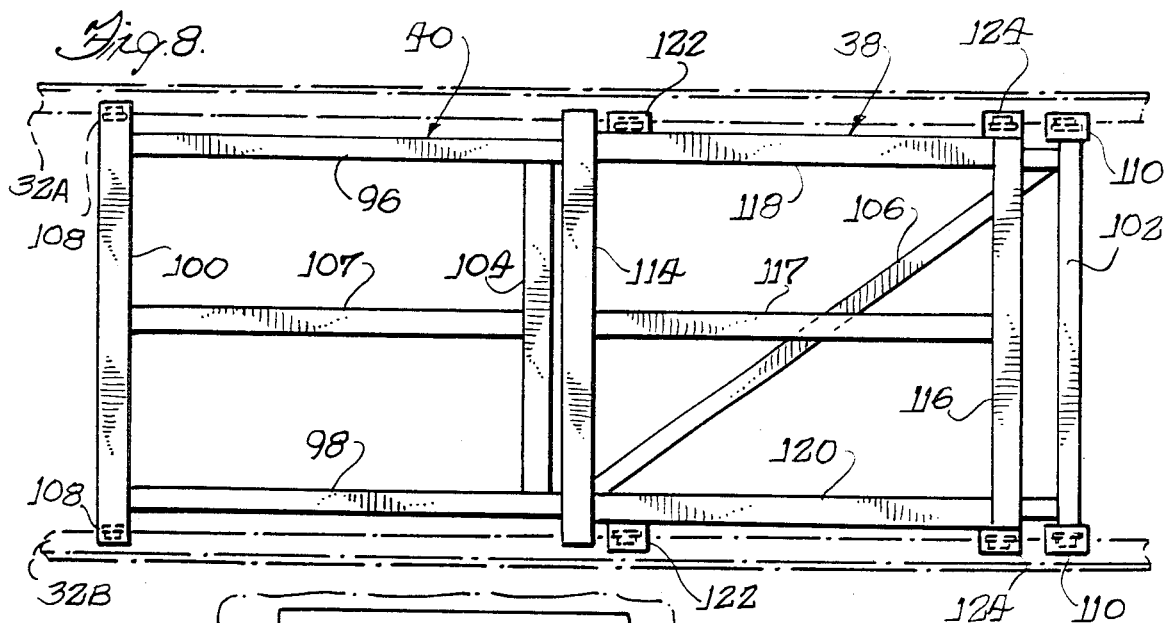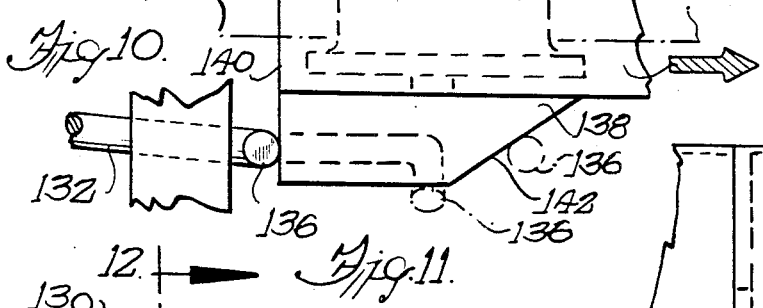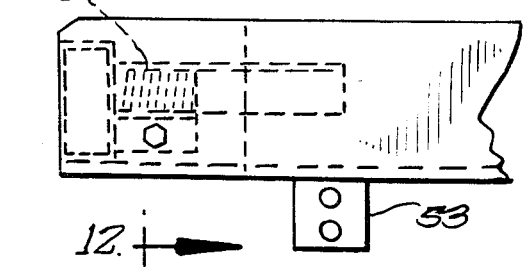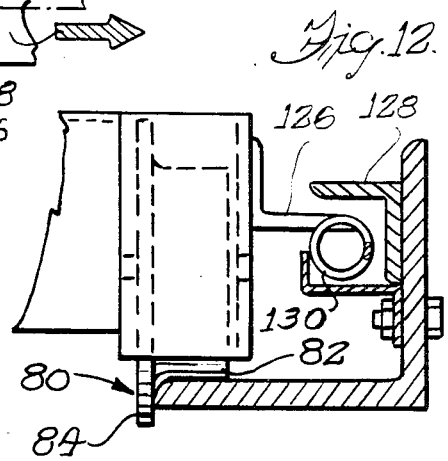

STORAGE RACK HAVING BAYS WITH MULTIPLE RAILS AND INTERLOCKING TROLLEYS

This is a continuation-in-part of U.S. application Ser. No. 552,667, filed Nov. 17, 1983.

BACKGROUND OF THE INVENTION

The present invention relates to warehouse storage arrangements and, more particularly, to storage racks having bays for receiving multiple loads.

It is common practice in warehouses to store goods at multiple levels using storage racks. Each rack defines an array of storage bays in horizontal and vertical rows. Typically, the racks are situated back-to-back with an aisle spacing each pair of racks, and each bay can receive only a single load of goods. More specifically, the goods are arranged on a pallet and a forklift truck is used to distribute the palletized loads to their desired storage locations.

It has been recognized that such warehousing arrangement wherein one aisle is required for each pair of racks, with each rack only one load deep, does not provide a particularly efficient use of floor space. To provide greater efficiency, storage racks have been proposed having greater depth so that loads can be stored at more than one location within each bay. One proposed storage rack is adapted to receive two loads of palleted goods through a front end, thereby essentially doubling the amount of storage area associated with each aisle. A first load of goods is placed upon a trolley in the storage bay, and the loaded trolley is moved rearwardly along a track to an inner or rear location when a second load is inserted into the same bay. The trolley, which is biased forward by resilient means, returns its load to the front location of the bay when the second load is removed. For further information regarding the structure and operation of this storage rack, reference may be made to U.S. Pat. No. 4,155,462.

In the system described in that patent, the weight of the second load prevents the forward return movement of the trolley until it is removed. It is recognized in the '462 patent that a light load in front of the trolley may be insufficient to prevent forward movement of the trolley; however, as the system is intended for use in warehouses of large capacity, this danger is dismissed as minimal. While the danger of a forward-biased trolley pushing a fully loaded pallet into the aisle may be minimal, such may not be the case when a pallet is nearly empty. In many warehouse facilities, goods will frequently be individually picked from a loaded pallet rather than withdrawn as an entire pallet load. If the load becomes sufficiently light, a forward-biased trolley may dislodge the pallet and shove it and the remaining goods into the aisle.

A recently proposed storage rack has bays which receive multiple loads through a front opening with the first-received load being movable on a trolley between a forward storage location and a rear storage location. Each bay has inclined rails, sloping downwardly toward the bay front end, so that the trolley is biased by the force of gravity toward its forward location. To retain the trolley at the rear location, releasably locking means are provided. With such storage rack, the pallet support surface of the trolley is not horizontal, but is disposed generally parallel to the trolley rails. A forklift truck operator after lifting a palletized load from the floor might not, for one reason or another, angle the pallet so that its engagement surface exactly matches that of the trolley support surface. Upon roughly setting the load on the trolley, the mismatch of surfaces could result in torque being applied to the trolley which could promote premature wear of rack and/or trolley components or, in an extreme situation, result in derailment of the trolley. Of course, the forklift operator could take the extra time required to angle the pallet so it matched the trolley support surface. This, however, reduces the operator's loading efficiency.

In another recently proposed storage rack, each bay also is adapted to receive multiple loads. Each bay is provided with one or more sets of rails which, while inclined, are all disposed at the same level. Up to three trolleys, the support surfaces of which are parallel to the rails, may be used in addition to a front platform so that a single bay may accommodate up to four loads. As the trolleys telescope, they are required to have legs of increasing height which limits the number of trolleys usable in a single bay. Furthermore, with this arrangement each trolley is required to roll on a different rail portion which makes difficult the provision of hold down means to retain the trolleys on their tracks in case a load might be dropped on a trolley thus applying torque which tends to lift the trolley wheels from their rails. For a further description of the structure and operation of this storage rack, reference may be made to U.S. Pat. No. 4,341,313.

SUMMARY OF THE INVENTION

Among the several objects of the present invention may be noted the provision of an improved storage rack having bays for receiving multiple loads; the provision of such rack having multiple trolleys in each bay for conveniently moving loads between storage locations in each bay; the provision of such rack having inclined rails to utilize the force of gravity to bias trolleys to their forward positions thereby avoiding using springs or other resilient means for such biasing; the provision of such rack holding trolley mounted loads disposed substantially horizontally to preclude component wear and reduce any chance of trolley derailment during mounting; the provision of such rack having multiple trolleys in a single bay without unduly increasing the trolley height; the provision of such rack which permits two trolleys to roll on a common portion of a single pair of rails to simplify rail design and to permit the convenient installation of hold down brackets; and the provision of such rack which is reliable in use, has long service life and is simple and economical to manufacture. Other objects and features of the present invention will be in part apparent and in part pointed out hereinafter in the specification and appended claims.

Briefly, a storage rack of the present invention comprises a plurality of bays each having at least a front storage location and a rear storage location. Each bay includes a front entrance through which loads can be inserted and removed and further includes support means for supporting a load at the front storage location. Rail means are provided disposed above the support means and extending between the storage locations. A trolley is used for carrying the first-received load with the trolley supported by the rail means and movable thereon between the locations whereby both loads can be inserted into the bay at the front storage location.

BRIEF DESCRIPTION OF THE DRAWINGS

FIG. 1 is a side elevational view showing one bay of the storage rack of the present invention, including a plurality of trolleys carrying loads with the trolleys disposed in their respective storage locations;

FIG. 2 is a front elevational view of the bay of FIG. 1 showing the various trolleys unloaded and all in the, front or loading location of the bays;

FIG. 3 is a schematic front elevational view of the storage rack of the present invention showing the arrangement of bays in columns and rows;

FIG. 4 is a plan of a lower rail frame including a pair of spaced parallel rails upon which moves a single trolley, and a front platform for supporting the last-received load;

FIG. 5 is a plan of an upper or intermediate rail frame including a pair of spaced parallel rails upon which move a pair of trolleys;

FIG. 6 is a side elevational view of a single trolley for use by itself on the lower rail frame;

FIG. 7 is a plan of a rear trolley of a pair for use on the upper or intermediate rail frame;

FIG. 8 is a plan of the pair of trolleys as they appear in use on an upper or intermediate rail frame;

FIG. 8A is a side elevational view of the front trolley of the pair shown in FIG. 8.

FIG. 9 is a front elevational view, enlarged in size, showing a releasable locking mechanism retaining a trolley at its storage location;

FIG. 10 is a fragmentary plan of a catch extension, carried by a trolley, for use with the locking mechanism of FIG. 9;

FIG. 11 is a side elevational view of a rail frame depicting a bumper spring for cushioning the impact of a trolley upon rolling to the front loading position; and FIG. 12 is a front elevational view, with certain components in section, illustrating a hold down bracket carried by a trolley for use with the bumper spring of FIG. 11 and also for use with an inwardly extending retention tongue of a rail frame.

Corresponding reference characters indicate corresponding components through the several views of the drawings.

DESCRIPTION OF THE PREFERRED EMBODIMENT

Referring now to the drawings, a storage rack of the present invention for mounting on, for example, a warehouse floor in order to support a plurality of loads of goods, comprises an array of bays 22 arranged in vertical and horizontal rows, schematically illustrated in FIG. 3. As shown in FIG. 1, each bay 22 is adapted to receive up to six loads of goods 24A-24F, and each bay includes a forward storage location 26A, a rear storage location 26F, and intermediate storage locations 26B-26E. Each bay also has lower, intermediate and upper rail means (28, 30 and 32, respectively) for supporting various trolleys for shuttling loads between their corresponding storage locations and the forward storage location which also serves as a loading location. Each bay has an open front entrance 33 for access to the forward storage location.

More specifically, lower rail means 28 carries a single trolley 34, best shown in FIG. 6, for shuttling load 24B between the front location 26A and storage location 26B. Rail means 28 comprises a support means 36 for supporting load 24A at the front storage location 24A.

The upper rail means 32 extends from front location 26A to rear location 26F, and supports an upper rear trolley 38 and an upper front trolley 40 for serving storage locations 26F and 26E, respectively. Finally, intermediate rail means 30 extends from the front location beyond lower rail means 28 and short of upper rail means 32 to intermediate storage location 26D. Rail means 30 carries an intermediate rear trolley 42 and an intermediate front trolley 44 for serving storage locations 26D and 26C, respectively.

Referring to FIG. 2, each trolley is shown unloaded and disposed in a stacked relationship at front location 26A. In loading the bay through entrance 33, the first-received load 24F is placed on trolley 38 which is then moved rearwardly by the pallet of the second load 24E as the fork lift driver advances it into the bay to be placed on trolley 40. This process of the pallet of a load being inserted moving rearwardly the last-loaded trolley continues until all trolleys have been moved rearwardly and support means 36 receives the last-received load 24A at front storage location 26A. The storage rack permits a LIFO storage method, and the retrieval method is the reverse of the loading method just described.

It will be appreciated that the particular number of bays in each vertical and horizontal row of the storage rack illustrated in FIG. 3 is merely exemplary. The particular arrangement of the number of vertical and horizontal rows is dictated by the physical layout of the warehouse wherein the storage racks are placed. Additionally, the number of storage locations in each bay is shown to be six; however, by adding additional rail means or by deleting the intermediate rail means 30, the number of storage locations can be varied to fit the requirements of each particular application.

As best shown in FIGS. 1 and 2, the storage rack has a frame work formed by a series of fore-and-aft extending laterally spaced trusses 46 with adjacent pairs of trusses defining vertical rows of bays 22. Each truss 46 is formed by aligned front, middle and rear vertical posts 48, 50, 52, respectively. As will be apparent to one of skill in the art, fore-and-aft extending x-bracing and straight braces (not fully shown) are used to interconnect corresponding posts to provide each truss with the necessary strength and rigidity to satisfy the loading requirements of a particular application. Each rail means comprises a frame and the frames have mounting plates 53 (see FIG. 11) for receiving fasteners to interconnect adjacent trusses to define each bay. Alternatively, the frames can be directly fastened to the trusses so that mounting plates 53 are not needed. The storage rack skeleton thus formed can be reinforced as necessary in view of the loading requirements.

Referring to FIG. 4, lower rail means 28 has a frame generally rectangular in plan and including spaced rail members 54, 55 interconnected by front and rear end members 56, 58, respectively. Rail member 54 is a length of angle iron which has a lower inwardly extending flange which constitutes a rail 28A while rail member 55 similarly has a lower inwardly extending flange constituting a rail 28B. Connected to rail member 54, 55 by dependent plates is an underlying cross beam 60 which, together with front end member 56, supports a trio of spaced longitudinally extending staves 62. Further strength and rigidity is obtained by adding diagonal bracing 64 between the side beams, if required. The rails 28A, 28B serve as a track for trolley 34 and lower rail means 28 is mounted between trusses so that the rails are inclined, sloping downwardly toward front entrance 33 to bias the trolley to the front storage location, due to the force of gravity. Staves 62 and cross beam 60 constitute support means 36 and together form a support surface 66 for receiving last-received load 24A, which support surface is substantially horizontal. It will be appreciated that the inclination of the rails shown in FIG. 1 is exaggerated somewhat to emphasize the gravity feed. As an example, for a system in which the upper rail extended a horizontal distance of about 21 feet, the upper rail would have a vertical rise of about 16 inches.

The lower trolley 34 is best shown in FIG. 6 and has a frame formed by spaced front and rear beams 68, 70 interconnected by spaced supports 72 which together define a support surface 74 for receiving palletized load of goods 24B. Fixed to the ends of front beam 68 are a pair of downwardly extending legs 76 preferably formed of box section housings. Carried by the respective ends of rear beam 70 are back trolley legs 78 extending upwardly. Each leg 76, 78 rotatably carries a wheel 80 generally at a corner of the trolley, and each wheel has a circumferential surface 82 for engaging its corresponding rail. Furthermore, each wheel has an interior flange 84 with the trolley being proportioned so that the various wheel flanges lie just interior of the edges of the rails 28A, 28B to prevent substantial lateral movement of the trolley relative to the rails. The lengths of legs 76, 78 are chosen to compensate for the inclination of the rails so that support surface 74 is disposed substantially horizontal.

Intermediate rail means 30 and upper rail means 32 (mounted above and parallel to the lower rail means) are substantially identical except for length, thus only upper rail means 32 need be discussed in detail. Referring to FIG. 5, upper rail means 32 includes a frame, also generally rectangular in plan, comprising spaced rail members 86, 88 interconnected by a trio of spaced cross beams 90, two of which are intermediate the ends of the side beams and the other cross beam interconnects the rear ends of the rail members. The front ends of the rail members are not interconnected, because a front cross beam would interfere with loading of the trolleys, but each rail member at its front end has an inwardly extending cap 92 carrying a bumper for stopping a trolley from falling from its bay 22. The rail members 86, 88 have inwardly extending lower flanges constituting rails 32A, 32B serving as a track for trolleys 38, 40. Diagonal bracing 94 is used to interconnect the cross beams for added rigidity.

As corresponding upper and intermediate trolleys are identical, only upper trolleys 38, 40 need be discussed in detail. Referring to FIGS. 8 and 8A, upper front trolley 40 is substantially twice the length of rear trolley 38 and includes a frame generally rectangular in plan and has a pair of spaced side beams 96, 98 bent intermediate their ends to form a forward portion for receiving load 24E and a rear portion extending generally upwardly from the forward portion as shown in FIG. 8A. The respective ends of side beams 96, 98 are joined by a front support 100 and a rear support 102 while a cross beam 104 joins the side beams at their bends. The rear portion may be reinforced by diagonal bracing 106 while a longitudinal support member 107 may be provided interconnecting cross beam 104 and front support 100. Trolley 40 has a forward set of legs 108 rotatably supporting front wheels 80 while rear legs 110 are provided carrying a rear set of wheels. The extent of the legs 108, 110 coupled with the degree of upward extention of the rear trolley portion, is chosen to compensate for the inclination of rails 32A, 32B so that the support surface 112 of the front trolley portion is substantially horizontally disposed.

Upper rear trolley 38 by itself is shown in FIG. 7 and is generally rectangular in plan. Trolley 38 is shown mounted on its rails and superimposed on front trolley 40 in FIG. 8; it includes a front member 114 and a rear member 116 interconnected by spaced side beams 118, 120. An optional longitudinal support member 117 interconnects the front and rear members for added strength and rigidity and also provides support for the pallet load. The trolley has downwardly extending front legs 122 and rear legs 124 each rotatably carrying a wheel 80. The lengths of the respective legs are again chosen to compensate for the inclination of rails 32A, 32B so that the support surface of trolley 38 is horizontal.

Trolley 38 is superimposed on trolley 40 so that the wheels of trolley 38 are straddled by the front and rear sets of wheels of trolley 40. Thus, trolley 38 can undergo limited movement with respect to trolley 40, by which it is captively retained. The front legs 108 of trolley 40 are disposed very close to its front end. The front legs 122 of trolley 38, while adjacent its front end, are spaced therefrom so that when both trolleys are at the forward storage and loading location, as shown in FIG. 2, the front ends of trolleys 38, 40 terminate substantially flush.

The front and rear wheel sets of trolleys 38, 40 all have substantially equal lateral spacing so that the corresponding wheels of each trolley roll on a common longitudinal portion of a corresponding rail. Furthermore, all the wheels have an interior flange for being straddled by rails 32A, 32B to inhibit lateral movement of the trolleys. It will be appreciated that the use of a common interior rail portion by both trolleys greatly simplifies rail design because, as shown in FIG. 12, the rail can be formed by a simple inwardly extending flange of an L-shaped angle member. Furthermore, the use of a common interior rail portion allows space for a hold down bracket 126 carried by a trolley frame for cooperation with an overhanging tongue 128 extending inwardly from the vertical flange of the L-shaped rail member of a rail frame, to retain the trolley on its rails in case a force is applied tending to lift the trolley from its track. Alternatively, the hold down function could be accomplished by mounting a rail member (or portion thereof) so that it closely overlies a trolley, to interfere with upward movement of the trolley, thus maintaining the trolley on its rails.

The hold down bracket 126 also serves as an abutment for engaging a spring bumper 130 disposed at the front end of each rail means to cushion and stop a trolley rolling to the front of its rail frame under the force of gravity.

Each of the three rail frames is also provided with a releasable locking mechanism for holding respective trolleys away from the forwardmost storage location 26A. As best shown in FIGS. 4 and 10, this mechanism includes an elongated rod 132 rotatably carried by collars affixed to cross beams of a rail frame. The rod has a U-shaped handle portion 134 adjacent the front of the frame, for manipulation by the operator. The rod terminates in an upstanding finger 136 serving as a catch for a horizontal abutment plate 138 extending from a trolley as shown in FIG. 10. The plate has a forward abutment surface 140 for engagement with finger 136 to retain the trolley at a rear location. Plate 138 also has a rear cam surface 142 for deflecting finger 136 out of the path of the trolley as the trolley is moved rearwardly to its storage location, as suggested by the phantom representations of finger 136. It will be understood that the rod 132 is weighted by the depending U-shaped section so that upon passage of the plate 138 over the finger, the finger will return to its vertical position to catch the abutment surface to preclude unintended return of the trolley to the forward location. Upon desired recall of the load, the operator simply uses handle 134 to rotate finger 136 out of the path of plate 138 to let gravity return the trolley to the forward location for unloading. Each rail frame carries such a mechanism, shown mounted at the left side of the bay. It is noted that the handle is mounted as far to the side as possible so as to be well out of the loading path.

The foregoing description of hold down brackets, bumpers and releasable locking mechanism was without reference to a particular trolley or rail frame. Although each rail frame and front trolley is equipped with them, a full showing and description of them is not included for the sake of brevity, clarity and because such full showing and description is considered non-essential to the present invention. For a fuller description and showing of features such as shock absorber means for absorbing kinetic energy of the trolley as it approaches the limit of its forward travel; stop means for limiting rearward travel of the trolley; trolley hold down brackets; locking means for releasably holding the trolley at the rear storage location; and speed governing means (such as hysteresis wheels for engaging wheels 80) for limiting the speed of a trolley; reference may be made to copending U.S. patent application Ser. No. 379,638, now U.S. Pat. No. 4,462,500, the teachings of which have been incorporated herein by reference.

Operation of the storage rack of the present invention is as follows: Loads of goods 24A–24F are supported on pallets 144 adapted for raising by a forklift truck or the like. The truck lifts the palletized load 24F to the desired bay without rotational movement of the load. Thus the lower engagement surface of the pallet and the support surface of the trolley 38 both are generally horizontally disposed. As the pallet bottom surface and the support surface of the trolley are angularly matched, the placement of the first-received load 24F on trolley 38 does not result in the application of significant torque to the trolley which could result in premature wear to rail and/or trolley components, or, in an extreme situation, result in derailment of the trolley. This simple alignment of the trolley support surface with the floor instead of the with the rails has the unexpected advantage of being able to very greatly simplify the job of the forklift operator and reduce the overall time it takes to perfectly position the loads 24.

When the forklift operator desires to place the second palletized load 24E in this bay, he aligns the load with the support surface of upper front trolley 40. As he drives the forklift toward the storage rack, the pallet of the second-received load 24E engages the front end of trolley 38 causing it to roll back from the forward storage location 26A to intermediate storage location 26B. This process continues with the fork lift operator loading the next available trolley with the load being received pushing the last-loading trolley (and all other loaded trolleys) back one storage location. Note that the horizontal spacing of the rail means 28, 30, 32 in FIG. 1, has been exaggerated to better show the trolleys. Finally, the pallet of the last load 24A pushes the five trolleys to their corresponding storage locations where the locking mechanisms retain them until their recall to the front storage location 26A for unloading, is desired.

By way of example for a six deep storage rack for holding goods loaded on 48" wide pallets, the width of each bay is 58". The lower rails 28A, B are 90" long, while the length of the middle and upper rails are 172" and 252", respectively. Referring to FIG. 2, the vertical distance at the front of a bay from the bottom of rails 28A, 28B to the support surface of the top rear trolley 38 is 16". The rolling surface of each wheel 80 has a diameter of $2\frac{1}{2}$" while the height of each trolley side beam is preferably $3\frac{1}{2}$".

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A storage rack comprising a plurality of bays, each bay having at least a front storage location and a rear storage location, each bay being adapted to receive at least two loads with the first-received load being movable between said locations, each bay comprising:
    an open front entrance end through which said loads can be inserted and removed;
    support means including a substantially horizontally disposed supporting surface for supporting a load at said front storage location;
    an upper rail means disposed above said supporting surface throughout the length of said first rail means and extending between said storage locations;
    a lower rail means extending between said front storage location and a first intermediate storage location, said two rail means being substantially parallel and having substantially identical widths; and
    a trolley for carrying said first-received load, said trolley being supported by said rail means and movable on said rail means between said locations whereby both loads can be inserted into said bay at said front storage location, said rail means being inclined downwardly toward said front end so that said trolley is biased by the force of gravity toward said front location, said supporting surface being formed, in part, by a structural member extending transversely with respect to said rail means and disposed remote from the open front entrance.

2. A rack as set forth in claim 1 wherein said trolley has a support surface for receiving said first-received load which support surface is disposed substantially horizontally.

3. A rack as set forth in claim 1 wherein said lower rail means comprises said support means, said bay further comprising a lower trolley for movement on said lower rail means between the last-mentioned storage locations.

4. A rack as set forth in claim 1 wherein said trolley is an upper rear trolley, said bay further comprising an upper front trolley movable on said upper rail means for carrying the second-received load between said front storage location and the penultimate storage location.

5. A rack as set forth in claim 4 wherein each of said rail means comprises a pair of spaced parallel rails, and wherein each of said trolleys has a generally rectangular frame, a support surface and four wheels, one wheel disposed adjacent each frame corner.

6. A rack as set forth in claim 5 wherein the front set of wheels of said upper rear trolley is disposed between the front and rear sets of wheels of said upper front trolley whereby relative movement between said upper trolleys is limited, the spacing between the wheels of each set of each upper trolley being substantially identical whereby corresponding wheels of each upper trolley roll on a common longitudinal portion of a corresponding upper rail.

7. A rack as set forth in claim 1 wherein each bay further comprises an intermediate rail means disposed between said upper and lower rail means and extending rearward parallel thereto, said intermediate rail means extending rearward from said front storage location beyond said lower rail means and short of the extent of said upper rail means, said bay further comprising intermediate trolleys movable on said intermediate rail means for serving second and third intermediate storage locations.

8. A storage rack comprising a plurality of bays, each bay having a front, an intermediate and a rear storage location, each bay being adapted to receive a trio of loads with the first-received load being movable between said front and rear locations and with the second-received load being movable between said front and intermediate locations, each bay comprising:
    an open front entrance end through which said loads can be inserted and removed;
    a pair of spaced parallel rails extending from said front location to said rear location;
    a first trolley for carrying said first-received load; and
    a second trolley for carrying said second-received load,
    each of said trolleys having a frame being generally rectangular in plan, having four wheels arranged in front and rear sets with one wheel carried adjacent each corner of said frame, the wheels of said first trolley being captively retained between the front set and rear set of wheels of said second trolley, the spacing between the wheels of each set of each trolley being substantially identical whereby corresponding wheels of each trolley roll on a common longitudinal portion of a corresponding rail.

9. A storage rack as set forth in claim 8 wherein said second trolley is substantially twice the length of said first trolley so that when said second trolley carries the second-received load at said intermediate position, said first trolley can carry said first-received load at said rear location.

10. A rack as set forth in claim 9 wherein said rails are inclined downwardly toward said front end.

11. A rack as set forth in claim 10 wherein each trolley has a support surface for receiving its load, each support surface being disposed substantially horizontally.

12. A rack as set forth in claim 9 wherein said frame of said second trolley has a forward portion having a load supporting surface and a rear portion extending rearwardly and upwardly relative to said front portion.

13. A storage rack comprising a plurality of bays, each bay having a front storage location, a rear storage location and at least two intermediate storage locations, each bay being adapted to receive at least four loads with the first-received load being movable between the front location and the rear location, the second-received load being movable between the front location and a rear intermediate location, and the third-received load being movable between the front location and the other intermediate location, each bay comprising:
    an open front entrance end through which said loads can be inserted and removed;
    a pair of lower rails extending from said front location to said other intermediate location and terminating short of said rear location;
    a pair of upper rails disposed above said pair of lower rails and extending from said front location to said rear location, both pairs of rails having substantially the same guage and being inclined downwardly toward said front end;
    first and second trolleys supported and movable on said pair of upper rails for carrying said first-received load and said second-received load, respectively; and
    a third trolley supported and movable on said pair of lower rails for carrying said third-received load.

14. A storage rack as set forth in claim 13 wherein said second trolley is substantially twice the length of said first trolley, said second trolley having a frame with a forward portion having a load supporting surface and a rear portion extending rearwardly and upwardly relative to said front portion.

* * * * *